(12) United States Patent
Tanabe et al.

(10) Patent No.: US 7,396,228 B2
(45) Date of Patent: Jul. 8, 2008

(54) FUEL GAS CALORIE CONTROL METHOD AND DEVICE

(75) Inventors: Hiroshi Tanabe, Takasago (JP); Hidekazu Yamashita, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 179 days.

(21) Appl. No.: 11/358,714

(22) Filed: Feb. 22, 2006

(65) Prior Publication Data

US 2006/0234171 A1    Oct. 19, 2006

(30) Foreign Application Priority Data

Apr. 19, 2005   (JP) .............................. 2005-120543

(51) Int. Cl.
*F02C 9/26*   (2006.01)

(52) U.S. Cl. .............................. 431/12; 431/5; 431/75; 431/89; 431/90; 60/39.12; 60/39.463; 60/39.465; 60/781; 60/783

(58) Field of Classification Search ...................... 431/5, 431/12, 76, 89, 90, 75; 60/39.12, 39.463, 60/39.465, 781, 783
See application file for complete search history.

(56) References Cited

U.S. PATENT DOCUMENTS

| | | | |
|---|---|---|---|
| 4,861,369 A | * | 8/1989 | von Bogdandy et al. ...... 75/492 |
| 4,936,089 A | * | 6/1990 | Komiyama et al. ......... 60/39.12 |
| 5,268,019 A | * | 12/1993 | Rathbone .................... 75/466 |
| 5,281,129 A | * | 1/1994 | Urushidani et al. ........... 431/12 |
| 6,572,674 B1 | * | 6/2003 | Avart et al. .................... 75/433 |

FOREIGN PATENT DOCUMENTS

| | | |
|---|---|---|
| DE | PS 917 759 | 9/1954 |
| DE | 38 05 397 A1 | 8/1989 |
| JP | 3-75409 | 3/1991 |
| JP | 6-331131 | 11/1994 |
| JP | 2001-4132 | 1/2001 |
| JP | 2004190632 A | 7/2004 |

OTHER PUBLICATIONS

German Office Action dated Dec. 20, 2007, Application No. 10 2006 008 484.5.

* cited by examiner

*Primary Examiner*—Terrence R. Till
*Assistant Examiner*—Andrew St. Clair
(74) *Attorney, Agent, or Firm*—Westerman, Hattori, Daniels & Adrian, LLP.

(57) ABSTRACT

Calories of a first mixed gas are predicted by calculations based on the mixed flow rate of a blast furnace gas and the mixed flow rate of a converter gas measured by flow meters, and preset blast furnace gas calories and converter gas calories; the flow rate ratio of the mixed flow rate of a coke oven gas to a gas turbine consumed fuel gas flow rate is calculated based on the predicted calories, set calories, and preset coke oven gas calories; the mixed flow rate required value of the coke oven gas is calculated based on the flow rate ratio and a gas turbine fuel gas requirement signal corresponding to the gas turbine consumed fuel gas flow rate; and the opening of a coke oven gas flow control valve provided in a fuel gas production system is controlled, based on the mixed flow rate required value, to control the mixed flow rate of the coke oven gas.

20 Claims, 7 Drawing Sheets

FUEL GAS CALORIE CONTROL METHOD AND DEVICE

BACKGROUND OF THE INVENTION

1. Field of the Invention

This invention relates to a fuel gas calorie control method and device for controlling the calories of a fuel gas (fuel gas produced using a blast furnace gas) which is supplied to blast furnace gas fired gas turbine equipment.

2. Description of the Related Art

An iron mill utilizes a blast furnace gas discharged from a blast furnace as a fuel gas for blast furnace gas fired gas turbine equipment, or utilizes it for other facilities to make the effective use of the blast furnace gas.

A blast furnace gas is a gas which is relatively low in calories, and always causes calorie changes, for example, depending on the operating state of a blast furnace. If a blast furnace gas is utilized as a fuel gas for blast furnace gas fired gas turbine equipment, therefore, a heat increasing gas is mixed with the blast furnace gas in order to produce a fuel gas utilizable for the blast furnace gas fired gas turbine equipment, and feedback on the calories of the mixed gas measured by a calorimeter is given to control the calories to a constant level. Moreover, advanced control is exercised such that the flow rate of the heat increasing gas mixed becomes a flow rate suitable for the flow rate of the gas turbine consumed fuel gas of the blast furnace gas fired gas turbine equipment.

Figure 7:
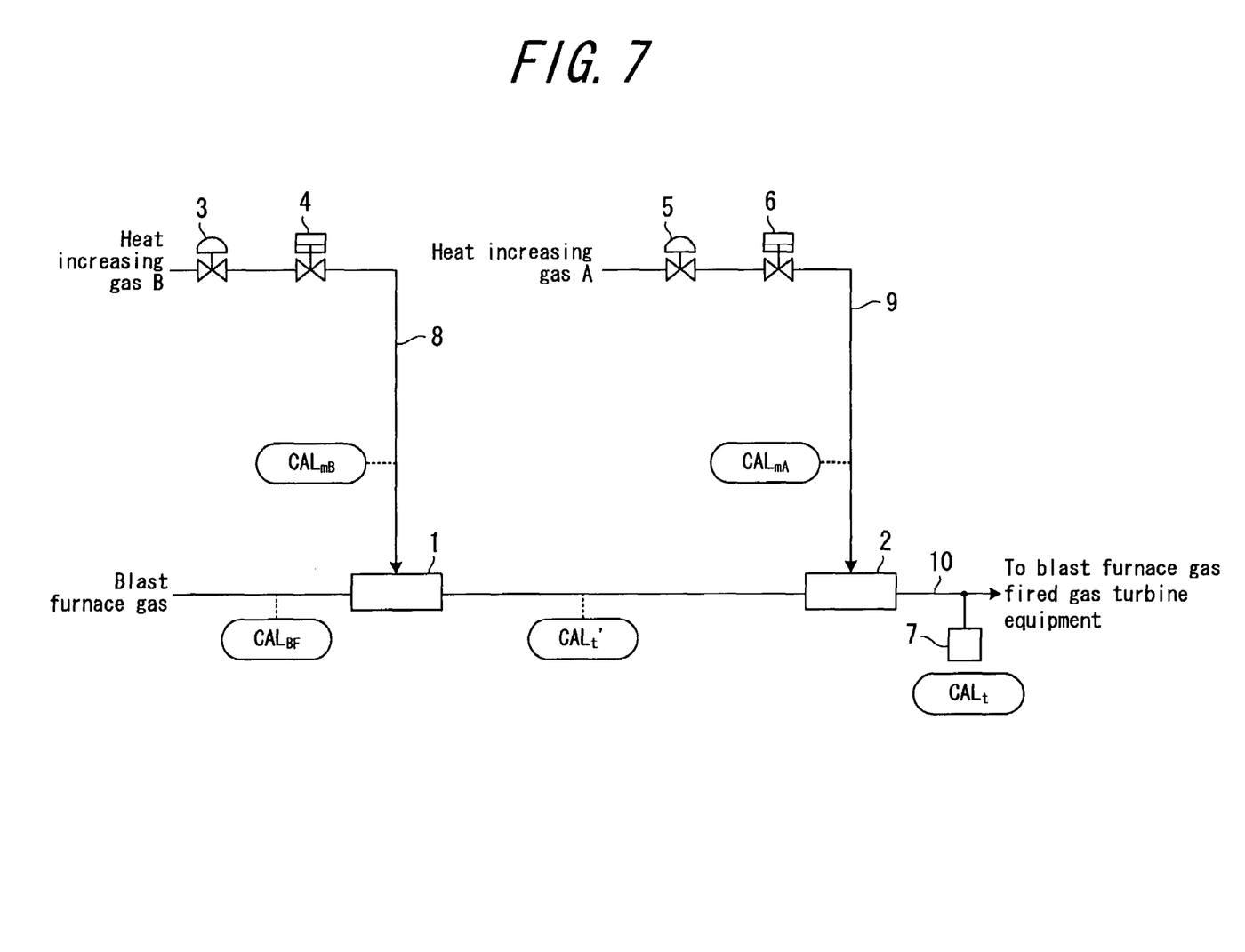
FIG. 7 is a configurational drawing of a conventional fuel gas production system.

This control will be explained further concretely based on FIG. 7. FIG. 7 is a configurational drawing of a conventional fuel gas production system. As shown in this drawing, a blast furnace gas and a heat increasing gas B (for example, a converter gas or a coke oven gas) are mixed in a first mixer 1, while a blast furnace gas and a heat increasing gas A (for example, a coke oven gas or a mixed gas consisting of a blast furnace gas and a coke oven gas) are mixed in a second mixer 2. A piping line 8 for supplying the heat increasing gas B to the mixer 1 is provided with a flow control valve 3 for the heat increasing gas B, and a shut-off valve 4 for the heat increasing gas B. On the other hand, a piping line 9 for supplying the heat increasing gas A to the mixer 2 is provided with a flow control valve 5 for the heat increasing gas A, and a shut-off valve 6 for the heat increasing gas A. The calories of a fuel gas to be supplied to blast furnace gas fired gas turbine equipment (i.e., the mixed gas consisting of the blast furnace gas and the heat increasing gas A, or the mixed gas consisting of the blast furnace gas and the heat increasing gas B) are measured by a fuel gas calorimeter 7 provided in a supply piping line 10 for the fuel gas. A conventional fuel gas calorie control device applied to this fuel gas production system exercises the following control:

(1) Advanced control is exercised on the assumption that the calories $CAL_{BF}$ of the blast furnace gas, the calories $CAL_{mA}$ of the heat increasing gas A, and the calories $CAL_{mB}$ of the heat increasing gas B are constant. The amount of fuel gas consumption in the blast furnace gas fired gas turbine equipment varies according to the operating state of the gas turbine equipment (i.e., gas turbine output). Thus, the flow control valve 5 for the heat increasing gas A or the flow control valve 3 for the heat increasing gas B is operated in advance in response to a heat increasing gas requirement signal based on a gas turbine fuel gas requirement signal appropriate to the gas turbine consumed fuel gas flow rate.

(2) Only one of the heat increasing gas A and the heat increasing gas B is used (only one of the shut-off valves 4 and 6 is opened). Thus, $CAL_t' = CAL_t$ always holds for the calories $CAL_t'$ of the mixed gas and the calories $CAL_t$ of the fuel gas measured by the calorimeter 7.

(3) If discrepancy occurs in the advanced control owing to changes in the calories of the blast furnace gas, namely, if the calories $CAL_t$ of the fuel gas measured by the calorimeter 7 differ from set calories (calories required by the blast furnace gas fired gas turbine equipment), the opening of the flow control valve 5 for the heat increasing gas A is controlled based on the deviation between the calories $CAL_t$ of the fuel gas measured by the calorimeter 7 and the set calories to control the flow rate of the heat increasing gas A, or the opening of the flow control valve 3 for the heat increasing gas B is controlled based on the above deviation to control the flow rate of the heat increasing gas B, thereby bringing the calories $CAL_t$ into agreement with the set calories (feedback control).

The following patent documents are available, for example, as prior art documents which disclose calorie control devices for a fuel gas (mixed gas):

Patent document 1 . . . Japanese Patent Application Laid-Open No. 2001-4132

Patent document 2 . . . Japanese Patent Application Laid-Open No. 1994-331131

The above-mentioned conventional fuel gas calorie control devices involved the following problems:

(1) Arbitrary mixing of the heat increasing gas into the blast furnace gas would contribute to calorie changes, and thus was not permissible.

(2) It was impossible to mix the two types of heat increasing gases A and B with the blast furnace gas at the same time and exercise control without interference.

(3) Since the calorimeter had a low response speed, the calorimeter was able to follow long-term (slow) calorie changes of the fuel gas (mixed gas), but was unable to follow short-term (rapid) calorie changes of the fuel gas (mixed gas) associated with changes in the flow rate of the heat increasing gas.

The present invention has been accomplished in light of the above-described circumstances. It is an object of the invention to provide a fuel gas calorie control method and device which can mix two types of heat increasing gases (first heat increasing gas, second heat increasing gas) into a blast furnace gas and exercise calorie control, can set the flow rate of the first heat increasing gas arbitrarily, can follow rapid calorie changes of a fuel gas (mixed gas) due to changes in the flow rate of the first heat increasing gas, and can further respond to calorie changes of the blast furnace gas, the first heat increasing gas, or the second heat increasing gas.

SUMMARY OF THE INVENTION

Summary of the Invention

A first aspect of the present invention, for attaining the above object, is a fuel gas calorie control method which is applied to a fuel gas production system for mixing a first heat increasing gas with a blast furnace gas discharged from a blast furnace of an iron mill to form a first mixed gas, further mixing a second heat increasing gas with the first mixed gas to form a second mixed gas, and supplying the second mixed gas, as a fuel gas, to blast furnace gas fired gas turbine equipment, and which exercises control such that calories of the second mixed gas become set calories required by the blast furnace gas fired gas turbine equipment, the fuel gas calorie control method comprising:

predicting calories of the first mixed gas by calculations based on a mixed flow rate of the blast furnace gas measured by blast furnace gas flow rate measuring means, a mixed flow rate of the first heat increasing gas measured by first heat increasing gas flow rate measuring means, preset blast furnace gas calories, and preset first heat increasing gas calories;

calculating a flow rate ratio of a mixed flow rate of the second mixed gas to a gas turbine consumed fuel gas flow rate based on the predicted calories, the set calories, and preset second heat increasing gas calories;

calculating a mixed flow rate required value of the second heat increasing gas based on the flow rate ratio and a gas turbine fuel gas requirement signal corresponding to the gas turbine consumed fuel gas flow rate; and controlling an opening of a second heat increasing gas flow control valve provided in the fuel gas production system, based on the mixed flow rate required value of the second heat increasing gas, to control a mixed flow rate of the second heat increasing gas.

A second aspect of the present invention is a fuel gas calorie control method which is applied to a fuel gas production system for mixing a first heat increasing gas with a blast furnace gas discharged from a blast furnace of an iron mill to form a first mixed gas, further mixing a second heat increasing gas with the first mixed gas to form a second mixed gas, and supplying the second mixed gas, as a fuel gas, to blast furnace gas fired gas turbine equipment, and which exercises control such that calories of the second mixed gas become set calories required by the blast furnace gas fired gas turbine equipment, the fuel gas calorie control method comprising:

predicting calories of the first mixed gas by calculations based on a mixed flow rate of the blast furnace gas measured by blast furnace gas flow rate measuring means, a mixed flow rate of the first heat increasing gas measured by first heat increasing gas flow rate measuring means, calories of the blast furnace gas measured by blast furnace gas calorie measuring means, and calories of the first heat increasing gas measured by first heat increasing gas calorie measuring means;

calculating a flow rate ratio of a mixed flow rate of the second mixed gas to a gas turbine consumed fuel gas flow rate based on the predicted calories, the set calories, and calories of the second heat increasing gas measured by second heat increasing gas calorie measuring means;

calculating a mixed flow rate required value of the second heat increasing gas based on the flow rate ratio and a gas turbine fuel gas requirement signal corresponding to the gas turbine consumed fuel gas flow rate; and controlling an opening of a second heat increasing gas flow control valve provided in the fuel gas production system, based on the mixed flow rate required value of the second heat increasing gas, to control a mixed flow rate of the second heat increasing gas.

A third aspect of the present invention is the fuel gas calorie control method according to the first or second aspect of the invention, which further comprises exercising opening control of the second heat increasing gas flow control valve in synchronism with a time when the first mixed gas arrives at a site of mixing of the first mixed gas and the second heat increasing gas.

A fourth aspect of the present invention is the fuel gas calorie control method according to the first, second or third aspect of the invention, which further comprises:

giving feedback on the calories of the second mixed gas measured by fuel gas calorie measuring means;

determining a correction amount for the mixed flow rate of the second heat increasing gas based on a deviation between the feedback calories of the second mixed gas and the set calories;

correcting the mixed flow rate required value of the second heat increasing gas with the correction amount; and controlling the opening of the second heat increasing gas flow control valve, based on the corrected mixed flow rate required value of the second heat increasing gas, to control the mixed flow rate of the second heat increasing gas.

A fifth aspect of the present invention is the fuel gas calorie control method according to the first, second, third or fourth aspect of the invention, wherein the first heat increasing gas is a converter gas discharged from a converter of the iron mill.

A sixth aspect of the present invention is the fuel gas calorie control method according to the first, second, third, fourth or fifth aspect of the invention, wherein the second heat increasing gas is a coke oven gas discharged from a coke oven of the iron mill, a mixed gas consisting of the coke oven gas and the blast furnace gas, or a city gas.

A seventh aspect of the present invention is a fuel gas calorie control device which is applied to a fuel gas production system for mixing a first heat increasing gas with a blast furnace gas discharged from a blast furnace of an iron mill to form a first mixed gas, further mixing a second heat increasing gas with the first mixed gas to form a second mixed gas, and supplying the second mixed gas, as a fuel gas, to blast furnace gas fired gas turbine equipment, and which exercises control such that calories of the second mixed gas become set calories required by the blast furnace gas fired gas turbine equipment, the fuel gas calorie control device comprising:

blast furnace gas flow rate measuring means for measuring a mixed flow rate of the blast furnace gas;

first heat increasing gas flow rate measuring means for measuring a mixed flow rate of the first heat increasing gas; and calorie control means which predicts calories of the first mixed gas by calculations based on the mixed flow rate of the blast furnace gas measured by the blast furnace gas flow rate measuring means, the mixed flow rate of the first heat increasing gas measured by the first heat increasing gas flow rate measuring means, preset blast furnace gas calories, and preset first heat increasing gas calories, calculates a flow rate ratio of a mixed flow rate of the second mixed gas to a gas turbine consumed fuel gas flow rate based on the predicted calories, the set calories, and preset second heat increasing gas calories, calculates a mixed flow rate required value of the second heat increasing gas based on the flow rate ratio and a gas turbine fuel gas requirement signal corresponding to the gas turbine consumed fuel gas flow rate, and controls an opening of a second heat increasing gas flow control valve provided in the fuel gas production system, based on the mixed flow rate required value of the second heat increasing gas, to control a mixed flow rate of the second heat increasing gas.

An eighth aspect of the present invention is a fuel gas calorie control device which is applied to a fuel gas production system for mixing a first heat increasing gas with a blast furnace gas discharged from a blast furnace of an iron mill to form a first mixed gas, further mixing a second heat increasing gas with the first mixed gas to form a second mixed gas, and supplying the second mixed gas, as a fuel gas, to blast furnace gas fired gas turbine equipment, and which exercises control such that calories of the second mixed gas become set calories required by the blast furnace gas fired gas turbine equipment, the fuel gas calorie control device comprising:

blast furnace gas flow rate measuring means for measuring a mixed flow rate of the blast furnace gas;

first heat increasing gas flow rate measuring means for measuring a mixed flow rate of the first heat increasing gas;

blast furnace gas calorie measuring means for measuring calories of the blast furnace gas;

first heat increasing gas calorie measuring means for measuring calories of the first heat increasing gas;

second heat increasing gas calorie measuring means for measuring calories of the second heat increasing gas; and calorie control means which predicts calories of the first mixed gas by calculations based on the mixed flow rate of the blast furnace gas measured by the blast furnace gas flow rate measuring means, the mixed flow rate of the first heat increasing gas measured by the first heat increasing gas flow rate measuring means, the calories of the blast furnace gas measured by the blast furnace gas calorie measuring means, and the calories of the first heat increasing gas measured by the first heat increasing gas calorie measuring means, calculates a flow rate ratio of a mixed flow rate of the second mixed gas to a gas turbine consumed fuel gas flow rate based on the predicted calories, the set calories, and the calories of the second heat increasing gas measured by the second heat increasing gas calorie measuring means, calculates a mixed flow rate required value of the second heat increasing gas based on the flow rate ratio and a gas turbine fuel gas requirement signal corresponding to the gas turbine consumed fuel gas flow rate, and controls an opening of a second heat increasing gas flow control valve provided in the fuel gas production system, based on the mixed flow rate required value of the second heat increasing gas, to control a mixed flow rate of the second heat increasing gas.

A ninth aspect of the present invention is the fuel gas calorie control device according to the seventh or eighth aspect of the invention, wherein the calorie control means includes second heat increasing gas flow control valve action timing adjusting means for exercising opening control of the second heat increasing gas flow control valve in synchronism with a time when the first mixed gas arrives at a site of mixing of the first mixed gas and the second heat increasing gas.

A tenth aspect of the present invention is the fuel gas calorie control device according to the seventh, eighth or ninth aspect of the invention, wherein the calorie control means includes feedback control means for giving feedback on the calories of the second mixed gas measured by fuel gas calorie measuring means, and determining a correction amount for the mixed flow rate of the second heat increasing gas based on a deviation between the feedback calories of the second mixed gas and the set calories, corrects the mixed flow rate required value of the second heat increasing gas with the correction amount determined by the feedback control means, and controls the opening of the second heat increasing gas flow control valve, based on the corrected mixed flow rate required value of the second heat increasing gas, to control the mixed flow rate of the second heat increasing gas.

An eleventh aspect of the present invention is the fuel gas calorie control device according to the seventh, eighth, ninth or tenth aspect of the invention, wherein the first heat increasing gas is a converter gas discharged from a converter of the iron mill.

A twelfth aspect of the present invention is the fuel gas calorie control device according to the seventh, eighth, ninth, tenth or eleventh aspect of the invention, wherein the second heat increasing gas is a coke oven gas discharged from a coke oven of the iron mill, a mixed gas consisting of the coke oven gas and the blast furnace gas, or a city gas.

The fuel gas calorie control method according to the first aspect of the invention and the fuel gas calorie control device according to the seventh aspect of the invention are characterized by:

predicting calories of the first mixed gas by calculations based on a mixed flow rate of the blast furnace gas measured by blast furnace gas flow rate measuring means, a mixed flow rate of the first heat increasing gas measured by first heat increasing gas flow rate measuring means, preset blast furnace gas calories, and preset first heat increasing gas calories;

calculating a flow rate ratio of a mixed flow rate of the second mixed gas to a gas turbine consumed fuel gas flow rate based on the predicted calories, the set calories, and preset second heat increasing gas calories;

calculating a mixed flow rate required value of the second heat increasing gas based on the flow rate ratio and a gas turbine fuel gas requirement signal corresponding to the gas turbine consumed fuel gas flow rate; and controlling an opening of a second heat increasing gas flow control valve provided in the fuel gas production system, based on the mixed flow rate required value of the second heat increasing gas, to control a mixed flow rate of the second heat increasing gas.

Thus, calorie control can be exercised by mixing the two types of heat increasing gases (first heat increasing gas, second heat increasing gas) with the blast furnace gas. Even if rapid calorie changes occur in the first mixed gas owing to flow rate changes of the first heat increasing gas, the calorie changes are predicted (predicted calories are calculated), and the flow rate of the second heat increasing gas is advancedly controlled so as to compensate for the calorie changes. Thus, the calories of the fuel gas (second mixed gas) can be kept at the set calories. Furthermore, the calorie changes of the first mixed gas due to the flow rate changes of the first heat increasing gas can be compensated for by the second heat increasing gas. Hence, the mixed flow rate of the first heat increasing gas can be set arbitrarily.

The fuel gas calorie control method according to the second aspect of the invention and the fuel gas calorie control device according to the eighth aspect of the invention are characterized by:

predicting calories of the first mixed gas by calculations based on a mixed flow rate of the blast furnace gas measured by blast furnace gas flow rate measuring means, a mixed flow rate of the first heat increasing gas measured by first heat increasing gas flow rate measuring means, calories of the blast furnace gas measured by blast furnace gas calorie measuring means, and calories of the first heat increasing gas measured by first heat increasing gas calorie measuring means;

calculating a flow rate ratio of a mixed flow rate of the second mixed gas to a gas turbine consumed fuel gas flow rate based on the predicted calories, the set calories, and calories of the second heat increasing gas measured by second heat increasing gas calorie measuring means;

calculating a mixed flow rate required value of the second heat increasing gas based on the flow rate ratio and a gas turbine fuel gas requirement signal corresponding to the gas turbine consumed fuel gas flow rate; and controlling an opening of a second heat increasing gas flow control valve provided in the fuel gas production system, based on the mixed flow rate required value of the second heat increasing gas, to control a mixed flow rate of the second heat increasing gas.

Thus, calorie control can be exercised by mixing the two types of heat increasing gases (first heat increasing gas, second heat increasing gas) with the blast furnace gas. Even if rapid calorie changes occur in the first mixed gas owing to flow rate changes of the first heat increasing gas, the calorie changes are predicted (predicted calories are calculated), and the flow rate of the second heat increasing gas is advancedly controlled so as to compensate for the calorie changes. Thus, the calories of the fuel gas (second mixed gas) can be kept at the set calories. Furthermore, the calorie changes of the first mixed gas due to the flow rate changes of the first heat increasing gas can be compensated for by the second heat increasing gas. Hence, the mixed flow rate of the first heat increasing gas can be set arbitrarily.

Furthermore, the blast furnace gas calories measured by the blast furnace gas calorie measuring means, the first heat increasing gas calories measured by the first heat increasing gas calorie measuring means, and the second heat increasing gas calories measured by the second heat increasing gas calorie measuring means are used in calculating the calories of the first mixed gas (i.e., predicted calories), or in calculating the mixed flow rate required value of the second heat increasing gas. Thus, even if the blast furnace gas calories, the first heat increasing gas calories, or the second heat increasing gas calories change, the flow rate of the second heat increasing gas is controlled to keep the calories of the fuel gas (second mixed gas) at the set calories. Hence, calorie changes of the blast furnace gas, the first heat increasing gas, or the second heat increasing gas can be accommodated.

The fuel gas calorie control method according to the third aspect of the invention and the fuel gas calorie control device according to the ninth aspect of the invention are characterized by exercising opening control of the second heat increasing gas flow control valve in synchronism with a time when the first mixed gas arrives at a site of mixing of the first mixed gas and the second heat increasing gas.

Thus, the mixing of the second heat increasing gas into the first mixed gas can be performed with a more proper timing, and the calories of the fuel gas (second mixed gas) can be controlled more accurately.

The fuel gas calorie control method according to the fourth aspect of the invention and the fuel gas calorie control device according to the tenth aspect of the invention are characterized by: giving feedback on the calories of the second mixed gas measured by fuel gas calorie measuring means; determining a correction amount for the mixed flow rate of the second heat increasing gas based on a deviation between the feedback calories of the second mixed gas and the set calories; correcting the mixed flow rate required value of the second heat increasing gas with the correction amount; and controlling the opening of the second heat increasing gas flow control valve, based on the corrected mixed flow rate required value of the second heat increasing gas, to control the mixed flow rate of the second heat increasing gas.

Thus, even if discrepancy occurs between the calories of the fuel gas (second mixed gas) and the set calories, feedback on the calories of the fuel gas (second mixed gas) measured by the fuel gas calorie measuring means is provided, whereby the flow rate of the second heat increasing gas can be subjected to feedback control so that the calories of the fuel gas (second mixed gas) agree with the set calories. Thus, the calories of the fuel gas (second mixed gas) can be controlled more accurately.

The fuel gas calorie control method according to the fifth aspect of the invention and the fuel gas calorie control device according to the eleventh aspect of the invention are characterized in that the two types of heat increasing gases (converter gas, second heat increasing gas) are mixed with the blast furnace gas for calorie control.

Thus, calorie control can be exercised even with the use, as the first heat increasing gas, of a gas facing flow rate changes, such as a converter gas discharged from a converter of the iron mill. Even if rapid calorie changes occur in the first mixed gas owing to flow rate changes of the converter gas, the calorie changes are predicted (predicted calories are calculated), and the flow rate of the second heat increasing gas is advancedly controlled so as to compensate for the calorie changes. Thus, the calories of the fuel gas (second mixed gas) can be kept at the set calories. Furthermore, the calorie changes of the first mixed gas due to the flow rate changes of the converter gas can be compensated for by the second heat increasing gas. Hence, the flow rate of the converter gas can be set arbitrarily. Furthermore, the blast furnace gas calories measured by the blast furnace gas calorie measuring means, the converter gas calories measured by the first heat increasing gas calorie measuring means, and the second heat increasing gas calories measured by the second heat increasing gas calorie measuring means are used in calculating the calories of the first mixed gas (i.e., predicted calories), or in calculating the mixed flow rate required value of the second heat increasing gas. Thus, even if the blast furnace gas calories, the converter gas calories, or the second heat increasing gas calories change, the flow rate of the second heat increasing gas is controlled to keep the calories of the fuel gas (second mixed gas) at the set calories. Hence, calorie changes of the blast furnace gas, the converter gas, or the second heat increasing gas can be accommodated.

The fuel gas calorie control method according to the sixth aspect of the invention and the fuel gas calorie control device according to the twelfth aspect of the invention are characterized in that the second heat increasing gas is a coke oven gas discharged from a coke oven of the iron mill, a mixed gas consisting of the coke oven gas and the blast furnace gas, or a city gas.

Thus, calorie control can be exercised by mixing the two types of heat increasing gases, i.e., the first heat increasing gas (converter gas), and the coke oven gas, a mixed gas consisting of the coke oven gas and the blast furnace gas, or a city gas, with the blast furnace gas. Even if rapid calorie changes occur in the first mixed gas owing to flow rate changes of the first heat increasing gas (converter gas), the calorie changes are predicted (predicted calories are calculated), and the flow rate of the coke oven gas, the mixed gas consisting of the coke oven gas and the blast furnace gas, or the city gas is advancedly controlled so as to compensate for the calorie changes. Thus, the calories of the fuel gas (second mixed gas) can be kept at the set calories. Furthermore, the calorie changes of the first mixed gas due to the flow rate changes of the first heat increasing gas (converter gas) can be compensated for by the coke oven gas, the mixed gas consisting of the coke oven gas and the blast furnace gas, or the city gas. Hence, the flow rate of the first heat increasing gas (converter gas) can be set arbitrarily. Furthermore, the blast furnace gas calories measured by the blast furnace gas calorie measuring means, the first heat increasing gas (converter gas) calories measured by the first heat increasing gas calorie measuring means, and the calories of the coke oven gas, the mixed gas consisting of the coke oven gas and the blast furnace gas, or the city gas measured by the second heat increasing gas calorie measuring means are used in calculating the calories of the first mixed gas (i.e., predicted calories), or in calculating the mixed flow rate required value of the coke oven gas, the mixed gas consisting of the coke oven gas and the blast furnace gas, or the city gas. Thus, even if a change occurs in the blast furnace gas calories, the converter gas calories, or the calories of the coke oven gas, the mixed gas consisting of the coke oven gas and the blast furnace gas, or the city gas, the flow rate of the coke oven gas, the mixed gas consisting of the coke oven gas and the blast furnace gas, or the city gas is controlled to keep the calories of the fuel gas (second mixed gas) at the set calories. Hence, calorie changes of the blast furnace gas, the converter gas, or the coke oven gas, the mixed gas consisting of the coke oven gas and the blast furnace gas, or the city gas can be accommodated.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Embodiments of the present invention will be described in detail with reference to the accompanying drawings.

Embodiment 1

Figure 1:
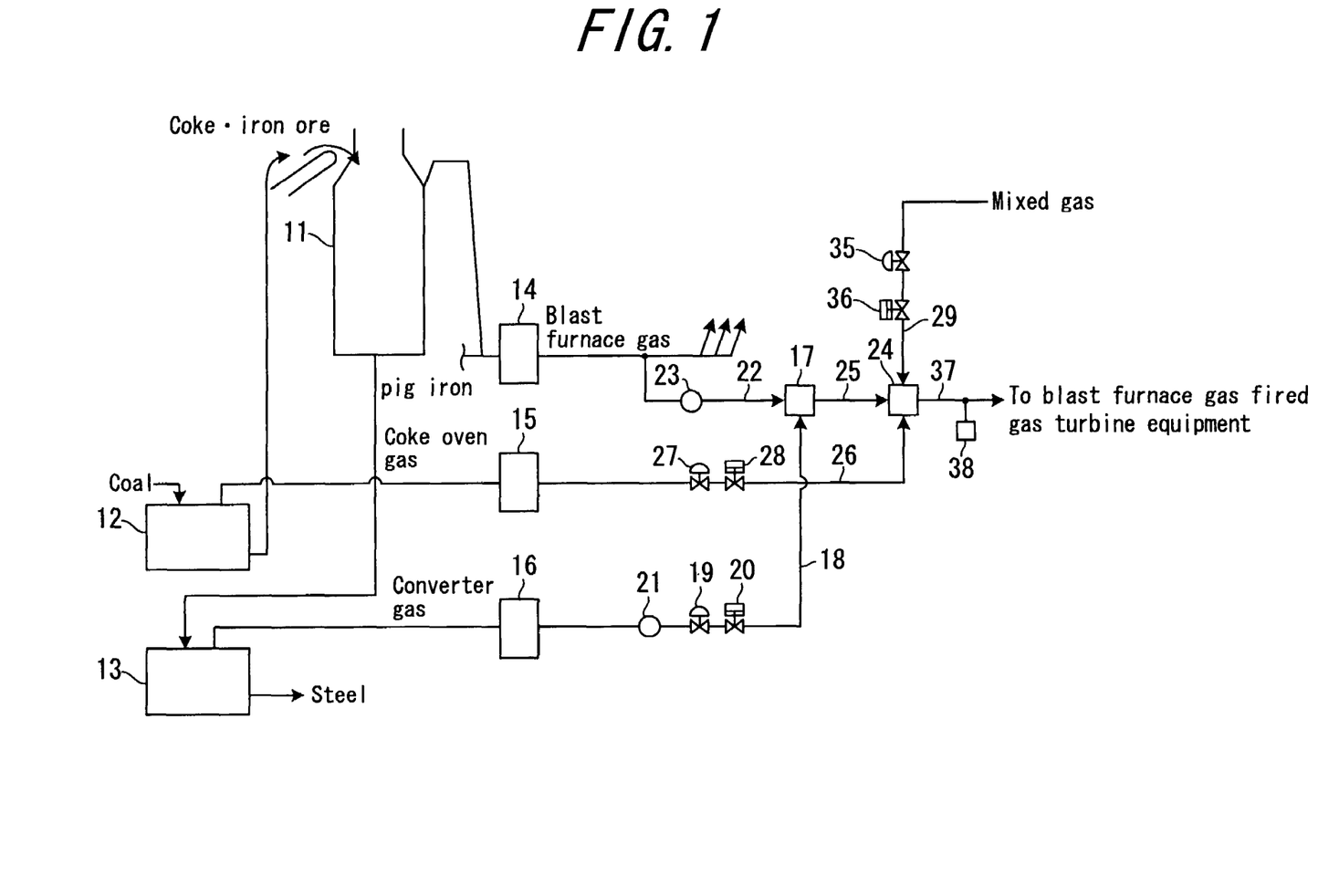
FIG. 1 is a configurational drawing of a fuel gas production system provided in an iron mill.
Figure 2:
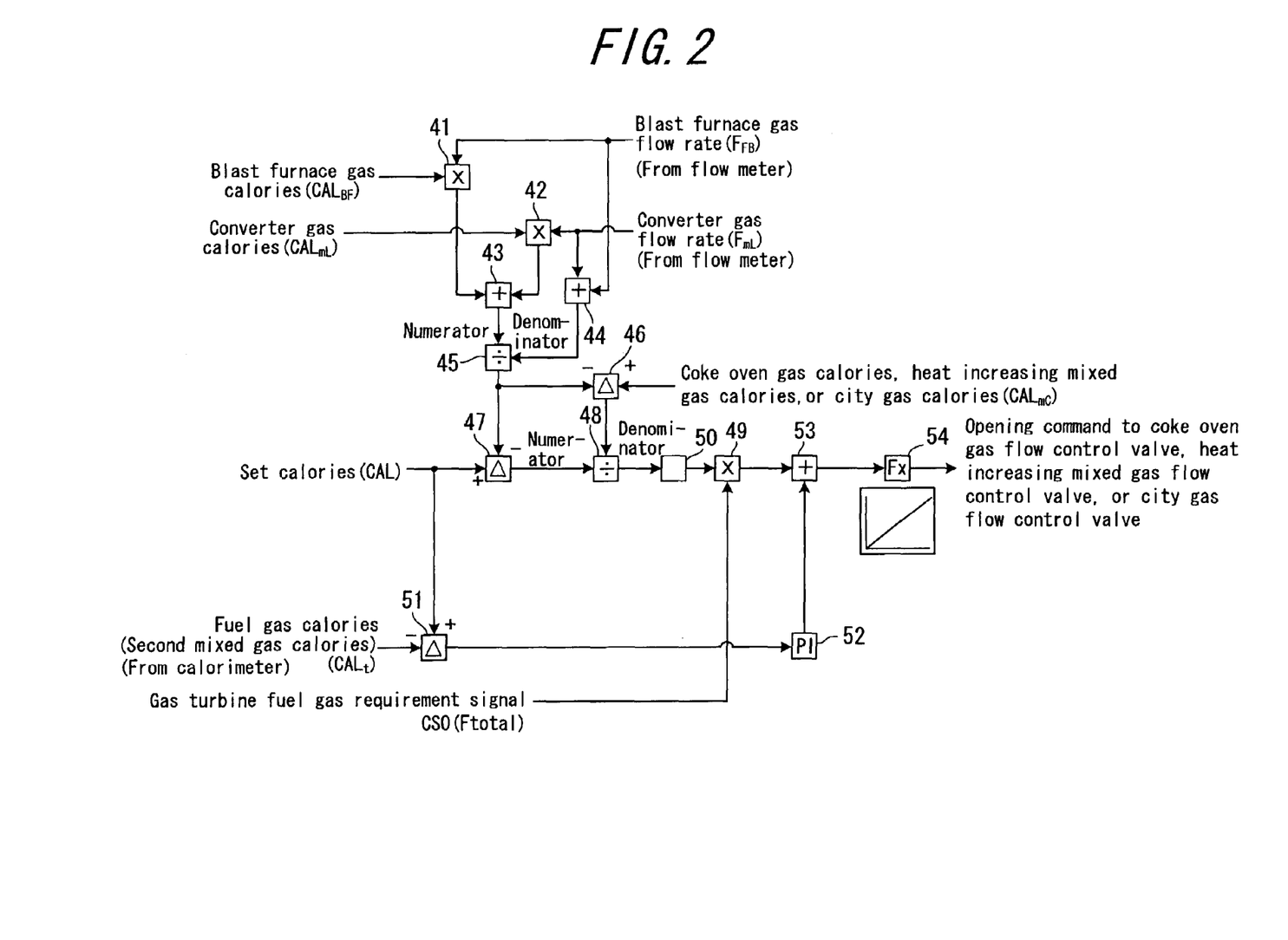
FIG. 2 is a block diagram showing the circuit configuration of a fuel gas calorie control device according to Embodiment 1 of the present invention applied to the fuel gas production system.
Figure 3:
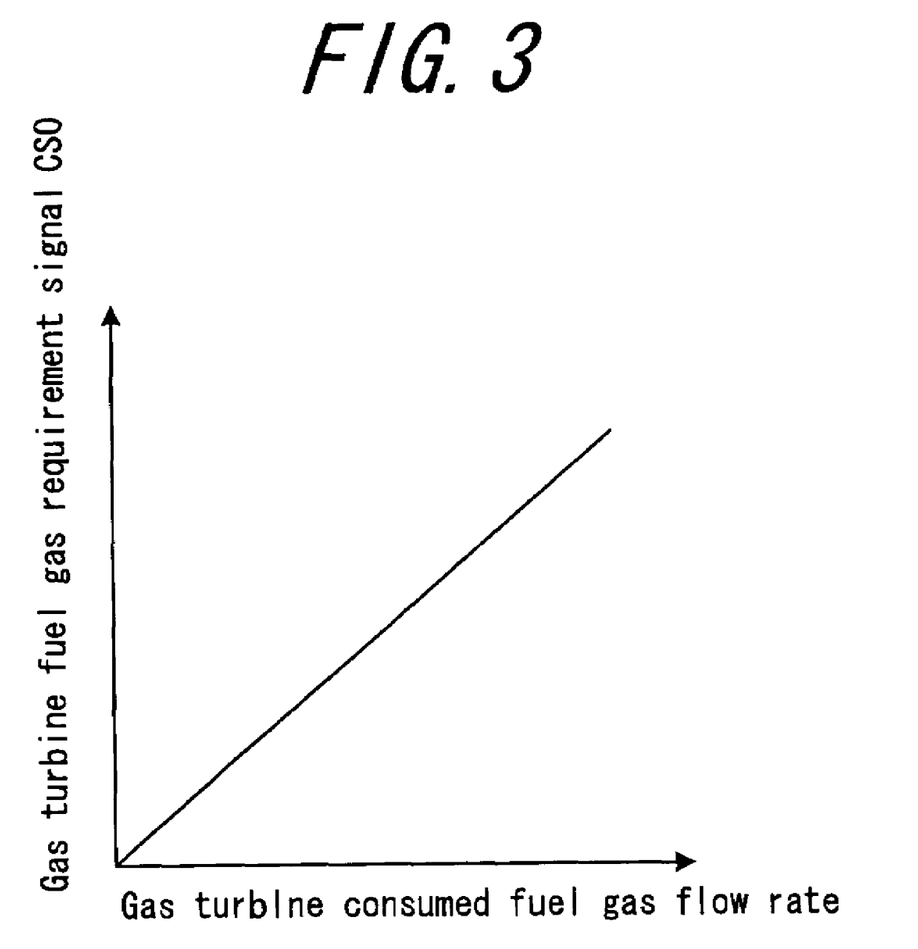
FIG. 3 is a graph showing the relationship between a gas turbine consumed fuel gas flow rate and a gas turbine fuel gas requirement signal.
Figure 4:
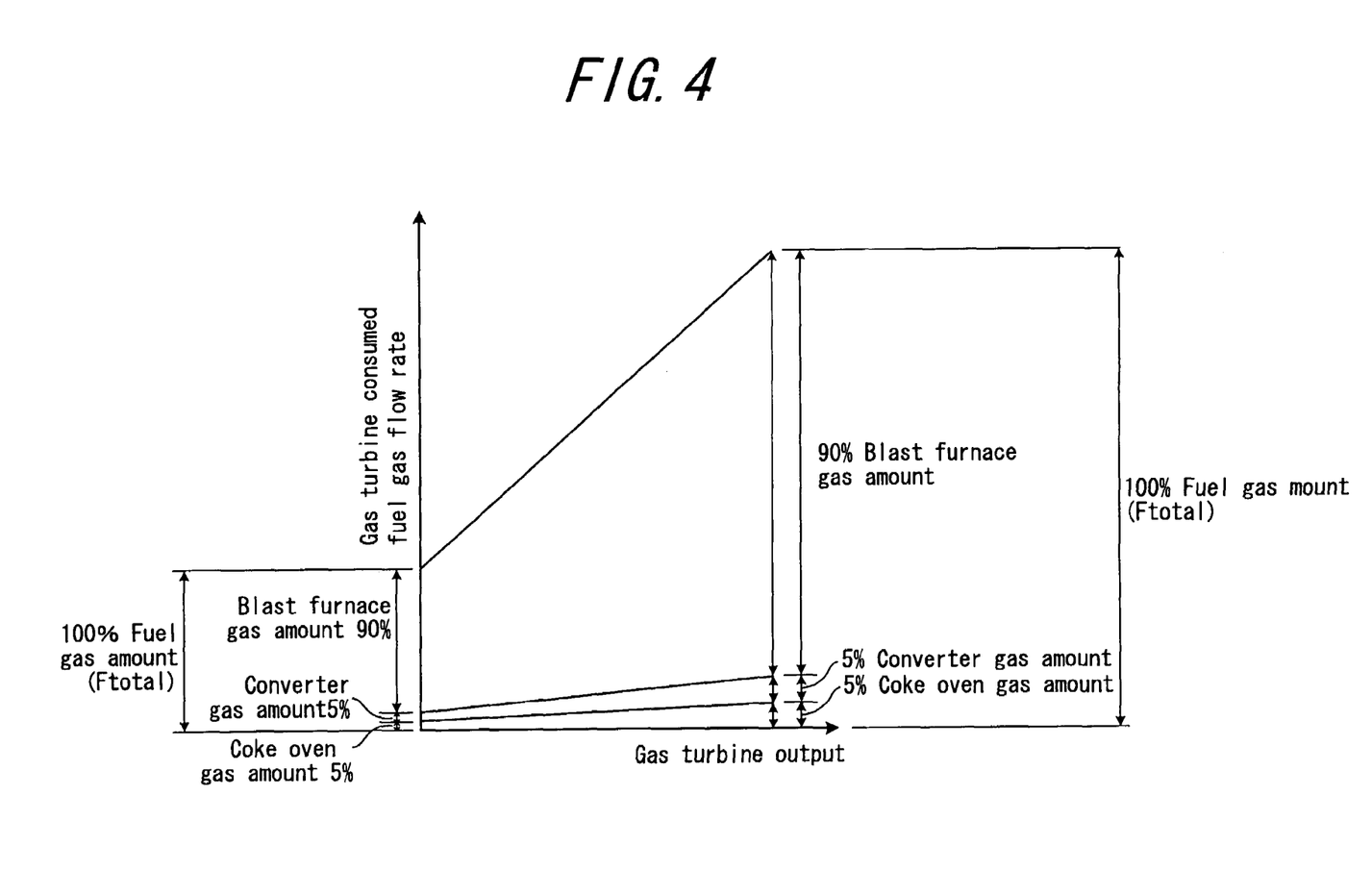
FIG. 4 is a graph showing an example of the mixing ratio among a blast furnace gas, a converter gas, and a coke oven gas for producing a fuel gas.

FIG. 1 is a configurational drawing of a fuel gas production system provided in an iron mill. FIG. 2 is a block diagram showing the circuit configuration of a fuel gas calorie control device according to Embodiment 1 of the present invention applied to the fuel gas production system. FIG. 3 is a graph showing the relationship between a gas turbine consumed fuel gas flow rate and a gas turbine fuel gas requirement signal. FIG. 4 is a graph showing an example of the mixing ratio among a blast furnace gas, a converter gas, and a coke oven gas for producing a fuel gas.

As shown in FIG. 1, an iron mill is equipped with a blast furnace (smelting furnace) 11, a coke oven 12, and a converter 13. The coke oven 12 is a furnace for producing coke from coal, and a coke oven gas (COGas) is generated in the coke oven 12 during this production. The coke oven gas contains flammable components, such as $H_2$ (55%), CO (7%) and $CH_4$ (20%), $N_2$ and $CO_2$, and its calories are, for example, 4,500 kcal/m³N. The blast furnace 11 is a furnace for producing pig iron from an iron ore. That is, the iron ore and the coke produced in the coke oven 12 are placed in the blast furnace 11, where they are combusted to melt the iron ore, producing pig iron. At this time, a blast furnace gas (BFGas) is generated in the blast furnace 11. The blast furnace gas contains, for example, CO (22%) and $H_2$ (3%) as flammable components, $CO_2$ and $N_2$, and its calories are, for example, 700 kcal/m³N. The converter 13 is a furnace for removing an untoward mixture from the pig iron produced in the blast furnace 11 to make steel. At this time, a converter gas (LDGas) is generated in the converter 13. The converter gas contains, for example, Co (70%) as a flammable component, $CO_2$ and $N_2$, and its calories are, for example, 2,000 kcal/m³N.

The blast furnace gas discharged from the blast furnace 11 is supplied to the fuel gas production system via a holder 14 serving as a buffer, whereby it is utilized as a gas for producing a fuel gas for blast furnace gas fired gas turbine equipment, and it is also utilized for other facilities of the iron mill. The coke oven gas discharged from the coke oven 12 is supplied to the fuel gas production system via a holder 15 serving as a buffer, whereby it is utilized as a gas for producing the fuel gas. The coke oven gas is also utilized for other facilities of the iron mill, although this is not illustrated. Similarly, the converter gas discharged from the converter 13 is supplied to the fuel gas production system via a holder 16 serving as a buffer, whereby it is utilized as a gas for producing the fuel gas. In the illustrated embodiment, the converter gas is utilized only as a gas for producing the fuel gas. The blast furnace gas, the coke oven gas, and the converter gas can be burned and released into the atmosphere, if they are not utilized in different equipments.

The blast furnace gas is a gas which is constantly generated during the operation of the blast furnace 11 (namely, during ironmaking). Thus, the blast furnace gas is a gas which can be supplied continuously stably to the fuel gas production system as a gas for production of the fuel gas. During the operation of the blast furnace 11, the operation of the coke oven 12 is also continued for supplying coke to the blast furnace 11. Thus, the coke oven gas is similarly a gas which can be supplied continuously stably to the fuel gas production system as a gas for production of the fuel gas. On the other hand, the converter 13 is adapted to produce steel by being operated at a time when a certain amount of pig iron is accumulated in the converter 13. Thus, the converter gas occurs intermittently, and changes in its flow rate are so great that the converter gas is relatively unstable as a gas for producing the fuel gas.

In the fuel gas production system, the first step is to mix the blast furnace gas and the converter gas as a first heat increasing gas in a first mixer 17 disposed on an upstream side, thereby forming a first mixed gas. Then, the coke oven gas as a second heat increasing gas is mixed into the first mixed gas in a second mixer 24 disposed downstream of the first mixer 17, thereby forming a second mixed gas. This second mixed gas is supplied, as a fuel gas, to blast furnace gas fired gas turbine equipment.

In the blast furnace gas fired gas turbine equipment, the fuel gas supplied from the fuel gas production system is controlled to reach a fuel gas flow rate required by the blast furnace gas fired gas turbine equipment (fuel gas flow rate commensurate with gas turbine output), based on a gas turbine fuel gas requirement signal CSO in a flow control section located on the blast furnace gas fired gas turbine equipment side. Further, the fuel gas is compressed by a compressor, and then supplied to a combustor of a gas turbine for combustion. The gas turbine fuel gas requirement signal CSO is a signal which represents a flow rate $F_{total}$ corresponding to (conforming to) a gas turbine consumed fuel gas flow rate, i.e., the fuel gas flow rate required by the blast furnace gas fired gas turbine equipment (fuel gas flow rate commensurate with gas turbine output), as shown in FIG. 3. For example, when the fuel gas flow rate, which is 80% of a rated fuel gas flow rate, is required for the blast furnace gas fired gas turbine equipment, the gas turbine fuel gas requirement signal CSO also serves as a signal representing the fuel gas flow rate which is 80% of the rated fuel gas flow rate.

As shown in FIG. 1, a piping line 22 for supplying the blast furnace gas to the first mixer 17 is provided with a blast furnace gas flow meter 23 as a blast furnace gas flow rate measuring means for measuring the mixed flow rate of the blast furnace gas. A piping line 18 for supplying the converter gas to the first mixer 17 is provided with a converter gas flow meter 21 as a first heat increasing gas flow rate measuring means for measuring the mixed flow rate of the converter gas, a converter gas flow control valve 19 as a first heat increasing gas flow control valve for controlling the mixed flow rate of the converter gas, and a converter gas shut-off valve 20 capable of shutting off the flow of the converter gas. The mixed flow rate of the converter gas can be controlled to a suitable flow rate by controlling the opening of the converter gas flow control valve 19 by means of a control device (not shown). For example, the opening of the converter gas flow control valve 19 may be controlled such that the flow rate of the converter gas is in a predetermined proportion to the gas turbine fuel gas requirement signal CSO (fuel gas flow rate $F_{total}$) Alternatively, the opening of the converter gas flow control valve 19 may be controlled such that the flow rate of the converter gas is always kept at a constant value based on the measured value of the converter gas flow meter 21. However, the converter gas is intermittently generated in accordance with the operating state of the converter 13 as stated earlier, so that the flow rate controllable (utilizable) by the converter gas flow control valve 19 varies greatly.

A piping line 26 for supplying the coke oven gas to the second mixer 24 is provided with a coke oven gas flow control valve 27 as a second heat increasing gas flow control valve for controlling the mixed flow rate of the coke oven gas, and a coke oven gas shut-off valve 28 capable of shutting off the flow of the coke oven gas. The first mixer 17 and the second mixer 24 are connected by a connecting piping line 25. A piping line 37 for supplying the second mixed gas (fuel gas) produced by the second mixer 24 to the blast furnace gas fired gas turbine equipment is provided with a fuel gas calorimeter 38 as a fuel gas calorie measuring means for measuring the calories of the second mixed gas (fuel gas).

Furthermore, the second mixer 24 can be supplied with, instead of the coke oven gas, a mixed gas consisting of the blast furnace gas and the coke oven gas, as a second heat increasing gas, via a heat increasing mixed gas supply piping line 29, or a city gas as the second heat increasing gas via a city gas supply piping line as will be described later. In connection with details of the mixed gas, the iron mill mixes the blast furnace gas and the coke oven gas to form a mixed gas, for example, having 2,000 kcal/m³N. Since this mixed gas is relatively stable in calories, it is also utilized by other equipment in the iron mill as an alternative to the coke oven gas. The heat increasing mixed gas supply piping line 29 is provided with a heat increasing mixed gas flow control valve 35 as a second heat increasing gas flow control valve for controlling the mixed flow rate of the heat increasing mixed gas, and a heat increasing mixed gas shut-off valve 36 capable of shutting off the flow of the heat increasing mixed gas.

The second heat increasing gas is not limited to the coke oven gas or the heat increasing mixed gas mentioned above, but it is possible to use a city gas such as LNG (liquefied natural gas) or LPG (liquefied petroleum gas) In this case, a city gas supply piping line may be connected to the second mixer 24, and the city gas supply piping line may be provided with a city gas flow control valve as a second heat increasing gas flow control valve for controlling the mixed flow rate of the city gas, and a city gas shut-off valve capable of shutting off the flow of the city gas. Any one of the coke oven gas, the heat increasing mixed gas, and the city gas is selected as the second heat increasing gas by opening any one of the coke oven gas shut-off valve 28, the heat increasing mixed gas shut-off valve 36, and the city gas shut-off valve.

Next, the circuit configuration of a fuel gas calorie control device applied to the fuel gas production system having the foregoing features will be described based on FIG. 2. A calorie control circuit as a calorie control means shown in FIG. 2 is constructed of software, and run by a computer of a turbine control device or the like. However, this is not necessarily limitative, and a personal computer or hardware may constitute the calorie control circuit. With the calorie control circuit, the coke oven gas flow control valve 27, the heat increasing mixed gas flow control valve 35, or the city gas flow control valve is controlled to control the mixed flow rate of the coke oven gas, the heat increasing mixed gas, or the city gas so that the fuel gas (second mixed gas) supplied from the fuel gas production system to the blast furnace gas fired gas turbine equipment has prescribed calories (set calories: e.g. 1,000 kcal/m³N) required by the blast furnace gas fired gas turbine equipment. Here, the control over the mixed flow rate of the coke oven gas is described, but control over the mixed flow rate of the heat increasing mixed gas or the city gas is the same as that for the coke oven gas.

In detail, as shown in FIG. 2, the calorie control circuit receives, as inputs, a blast furnace gas flow rate $F_{FB}$ (a measurement signal representing the measured value of flow rate) which is the mixed flow rate of the blast furnace gas measured by the blast furnace gas flow meter 23, a converter gas flow rate $F_{mL}$ (a measurement signal representing the measured value of flow rate) which is the mixed flow rate of the converter gas measured by the converter gas flow meter 21, and fuel gas calories $CAL_t$ (a measurement signal representing the measured value of calories) being the calories of the fuel gas (second mixed gas) measured by the fuel gas calorimeter 37. Also, prescribed calories (set calorific value CAL) required by the blast furnace gas fired gas turbine equipment are preset (for example, set at 1,000 kcal/m³N) in the calorie control circuit. Moreover, blast furnace gas calories $CAL_{BF}$, coke oven gas calories $CAL_{mC}$, and converter gas calories $CAL_{mL}$ are also preset (for example, set at 700 kcal/m³N, 4,500 kcal/m³N, and 2,000 kcal/m³N, respectively). These set values may be arranged such that they can be arbitrarily set in predetermined ranges by an operator using setting instruments.

In the calorie control circuit, moreover, the gas turbine fuel gas requirement signal (fuel gas control signal) CSO is entered from the blast furnace gas fired gas turbine equipment.

Of the control functions of the calorie control circuit, an advanced control function will be described first of all. As shown in FIG. 2, a multiplying section 41 multiplies the blast furnace gas flow rate $F_{FB}$ (km³N/hr) and the blast furnace gas calories $CAL_{BF}$ (kcal/m³N) (i.e., $F_{FB} \times CAL_{BF}$). In a multiplying section 42, the converter gas flow rate $F_{mL}$ (km³N/hr) and the converter gas calories $CAL_{mL}$ (kcal/m³N) are multiplied (i.e., $F_{mL} \times CAL_{mL}$). In an adding section 43, the product in the multiplying section 41 and the product in the multiplying section 42 are added ($F_{FB} \times CAL_{BF} + F_{mL} \times CAL_{mL}$).

In an adding section 44, the blast furnace gas flow rate $F_{FB}$ and the converter gas flow rate $F_{mL}$ are added ($F_{FB} + F_{mL}$). In a dividing section 45, the sum in the adding section 43 (numerator) is divided by the sum in the adding section 44 (denominator) (i.e., ($F_{FB} \times CAL_{BF} + F_{mL} \times CAL_{mL})/(F_{FB} + F_{mL})$). That is, the division in the dividing section 45 determines (predicts) the calories (predicted calories $CAL_t'$) of the first mixed gas formed by the mixing of the blast furnace gas and the converter gas in the first mixer 17.

In a deviation computing section 46, a deviation between the quotient (predicted calories $CAL_t'$) in the dividing section 45 and the preset coke oven gas calories $CAL_{mC}$ is computed ($CAL_{mC}-CAL_t'$). In a deviation computing section 47, a deviation between the quotient (predicted calories $CAL_t'$) in the dividing section 45 and the set calories CAL is computed ($CAL-CAL_t'$). In a dividing section 48, division is carried out for the computed deviation (denominator) in the deviation computing section 46 and the computed deviation (numerator) in the deviation computing section 47 (($CAL-CAL_t'$)/($CAL_{mC}-CAL_t'$)). That is, the division in the dividing section 48 determines the ratio between the flow rate $F_{total}$ of the second mixed gas (fuel gas), formed by mixing the first mixed gas and the coke oven gas in the second mixer 24, and the flow rate $F_{mC}$ of the coke oven gas necessary for rendering the calories of the second mixed gas (fuel gas) the set calories CAL, i.e., the ratio ($F_{mC}/F_{total}$).

In a multiplying section 49, the flow rate ratio ($F_{mC}/F_{total}$) determined by the dividing section 48 is multiplied by the value of the gas turbine fuel gas requirement signal CSO, i.e., $F_{total}$, (($F_{mC}/F_{total}$)×$F_{total}$). That is, the multiplication in the multiplying section 49 determines the required value of the mixed flow rate $F_{mC}$ necessary for rendering the calories of the second mixed gas (fuel gas) the set calories CAL.

However, a delay section 50 is provided between the dividing section 48 and the multiplying section 49 so that the execution of the multiplication in the multiplying section 49 can be delayed by a set time (dead time) in the delay section 50. The delay section 50 is a timing adjusting means for carrying out the opening control of the coke oven gas flow control valve 27 in synchronism with times when the blast furnace gas having the flow rate measured by the blast furnace gas flow meter 23 and the first heat increasing gas (converter gas) having the flow rate measured by the converter gas flow meter 21 are mixed in the first mixer 17 (first mixed gas), and the first mixed gas is further mixed with the coke oven gas in the second mixer 24. The concrete set time in the delay section 50 can be appropriately set by calculations and experiments based on the actual lengths of the piping lines and the actual gas flow velocities. It is, for example, 5 to 6 seconds.

Next, the feedback control function of the calorie control circuit will be described. In a deviation computing section 51, a deviation between the set calories CAL and the fuel gas calories $CAL_t$ measured by the fuel gas calorimeter 38 is computed ($CAL-CAL_t$). In a PI (proportional plus integral) control section 52, PI control is effected based on the deviation computed in the deviation computing section 51 to determine a correction amount for the mixed flow rate of the coke oven gas. Here, the control means is not necessarily limited to PI control, and other control means can be applied.

In an adding section 53, the required value of the flow rate $F_{mC}$ of the coke oven gas (i.e., the product in the multiplying section 49) found in the advanced control section, and the correction amount $F_{mC}'$ for the mixed flow rate of the coke oven gas obtained in the feedback control section (i.e., the output value of the PI control section 52) are added ($F_{mC}$+$F_{mC}'$). In this manner, the required value of the flow rate $F_{mC}$ of the coke oven gas found in the advanced control section (i.e., the product in the multiplying section 49) is corrected with the correction amount $F_{mC}'$ of the coke oven gas flow rate found in the feedback control section. The corrected mixed flow rate required value of the coke oven gas is converted in a function computing section 54 into the opening of the coke oven gas flow control valve 27 corresponding to the mixed flow rate required value of the coke oven gas, whereby a valve opening command is outputted to the coke oven gas flow control valve 27. Thus, the opening of the coke oven gas flow control valve 27 is controlled to the value of the valve opening command, so that the mixed flow rate of the coke oven gas is controlled to the mixed flow rate required value of the coke oven gas.

As described above, according to the fuel gas calorie control device of the present Embodiment 1, the calories of the first mixed gas are predicted by calculations based on the mixed flow rate $F_{FB}$ of the blast furnace gas measured by the blast furnace gas flow meter 23, the mixed flow rate $F_{mL}$ of the converter gas measured by the converter gas flow meter 21, the preset blast furnace gas calories $CAL_{BF}$, and the preset converter gas calories $CAL_{mL}$. The flow rate ratio of the mixed flow rate of the coke oven gas (or the heat increasing mixed gas or city gas) to the gas turbine consumed fuel gas flow rate is calculated based on the above predicted calories, the set calories CAL, and the preset coke oven gas calories $CAL_{mC}$ (or the preset heat increasing mixed gas calories or city gas calories). The mixed flow rate required value of the coke oven gas (or the heat increasing mixed gas or city gas) is calculated based on the above flow rate ratio, and the gas turbine fuel gas requirement signal CSO corresponding to the gas turbine consumed fuel gas flow rate. The opening of the coke oven gas flow control valve 27 (or the heat increasing mixed gas flow control valve 35 or the city gas flow control valve) provided in the fuel gas production system is controlled based on the above mixed flow rate required value to control the mixed flow rate of the coke oven gas (or the heat increasing mixed gas or city gas). Thus, the following actions and effects are obtained:

The mixed flow rate of the coke oven gas (or the heat increasing mixed gas or city gas) changes (increases or decreases) in a constant proportion, in accordance with changes (increases or decreases) in the gas turbine fuel gas requirement signal CSO, namely, in accordance with changes (increases or decreases) in the gas turbine consumed fuel gas flow rate associated with changes (increases or decreases) in the gas turbine output, for example, as illustrated in FIG. 4. The blast furnace gas is increased by exercising control so as to reach the fuel gas flow rate required by the blast furnace gas fired gas turbine equipment (fuel gas flow rate suited to the gas turbine output) based on the gas turbine fuel gas requirement signal CSO in the fuel control section on the blast furnace gas fired gas turbine equipment side (i.e., fuel gas flow control valve). The converter gas is increased, for example, by controlling the opening of the converter gas flow control valve 19 such that the converter gas flow rate is in a constant proportion to the gas turbine fuel gas requirement signal CSO (fuel gas flow rate $F_{total}$).

The present fuel gas calorie control device can exercise calorie control by mixing the two types of heat increasing gases, namely, the converter gas and the coke oven gas (or the heat increasing mixed gas or city gas), with the blast furnace gas. Moreover, even if rapid calorie changes occur in the first mixed gas owing to flow rate changes of the converter gas according to the operating state of the converter 13, the calorie changes are predicted (predicted calories are calculated), and the flow rate of the coke oven gas (or the heat increasing mixed gas or city gas) is advancedly controlled so as to compensate for the calorie changes. Thus, the calories of the fuel gas (second mixed gas) can be kept at the set calories CAL. Furthermore, the calorie changes of the first mixed gas due to the flow rate changes of the converter gas can be compensated for by the coke oven gas (or the heat increasing mixed gas or city gas). Thus, the mixed flow rate of the converter gas can be set arbitrarily. In other words, the relatively unstable converter gas can be utilized as a gas for producing the fuel gas by compensating for the calorie changes of the first mixed gas according to the flow rate changes of the converter gas by the relatively stable coke oven gas (or the heat increasing mixed gas or city gas).

Besides, the opening control of the coke oven gas flow control valve 27 (or the heat increasing mixed gas flow control valve 35 or the city gas flow control valve) is exercised in synchronism with a time when the first mixed gas arrives at the second mixer 24 as the site of mixing of the first mixed gas and the coke oven gas (or the heat increasing mixed gas or city gas). Thus, the mixing of the coke oven gas (or the heat increasing mixed gas or city gas) into the first mixed gas can be performed with a more proper timing, and the calories of the fuel gas (second mixed gas) can be controlled more accurately.

In addition, feedback on the calories of the fuel gas (second mixed gas) measured by the fuel gas calorimeter 38 is given. A correction amount for the mixed flow rate of the coke oven gas (or the heat increasing mixed gas or city gas) is determined based on the deviation between the feedback calories of the fuel gas (second mixed gas) and the set calories CAL. The mixed flow rate required value of the coke oven gas (or the heat increasing mixed gas or city gas) is corrected with this correction amount. The opening of the coke oven gas flow control valve 27 (or the heat increasing mixed gas flow control valve 35 or the city gas flow control valve) is controlled based on the corrected mixed flow rate required value to control the mixed flow rate of the coke oven gas (or the heat increasing mixed gas or city gas). Thus, even if discrepancy occurs between the calories of the fuel gas (second mixed gas) and the set calories CAL, feedback on the calories $CAL_t$ of the fuel gas (second mixed gas) measured by the fuel gas calorimeter 38 is provided, whereby the flow rate of the coke oven gas (or the heat increasing mixed gas or city gas) can be subjected to feedback control so that the calories of the fuel gas (second mixed gas) agree with the set calories CAL. Thus, the calories of the fuel gas (second mixed gas) can be controlled more accurately.

Embodiment 2

Figure 5:
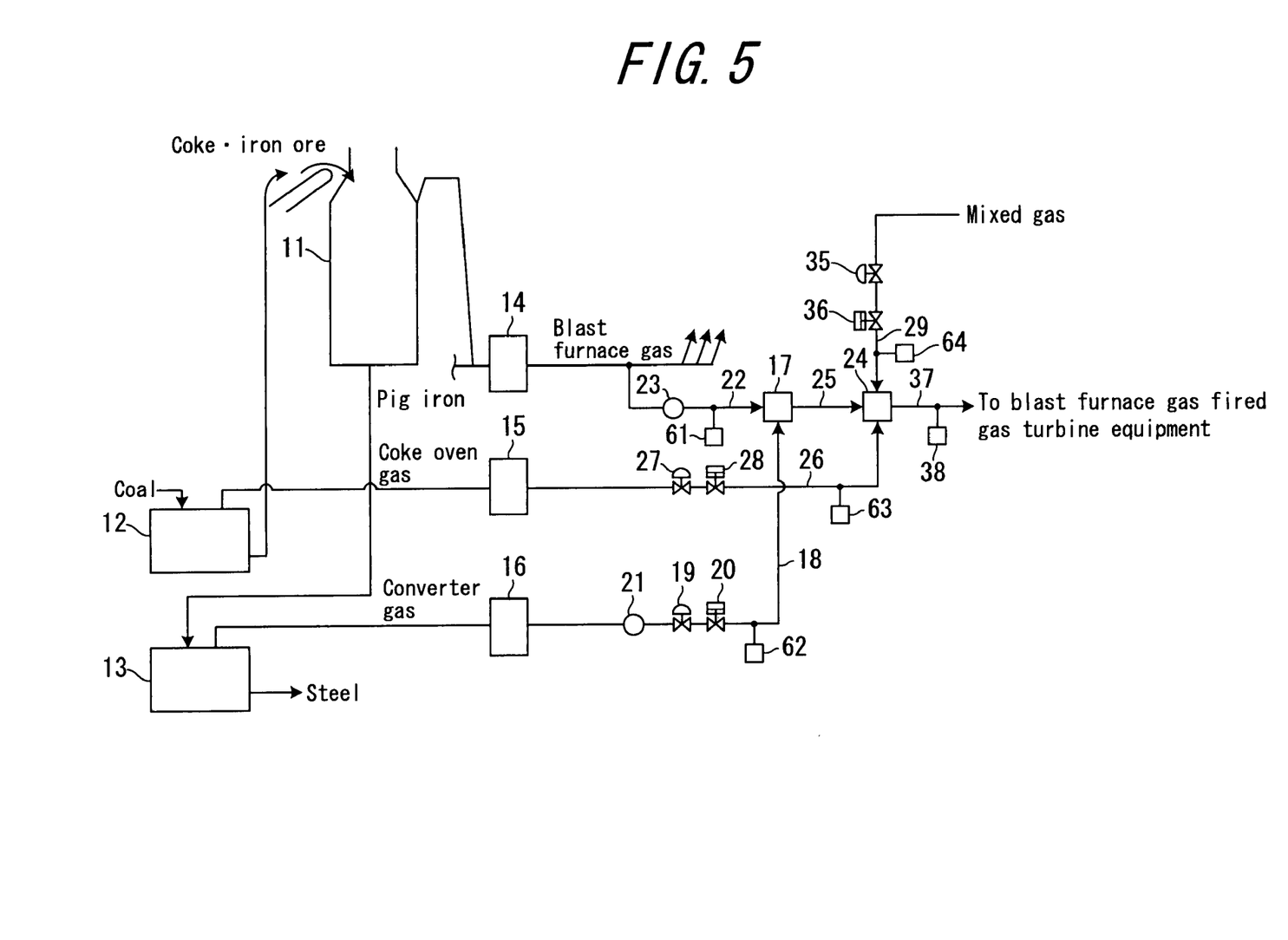
FIG. 5 is a configurational drawing of a fuel gas production system provided in an iron mill.
Figure 6:
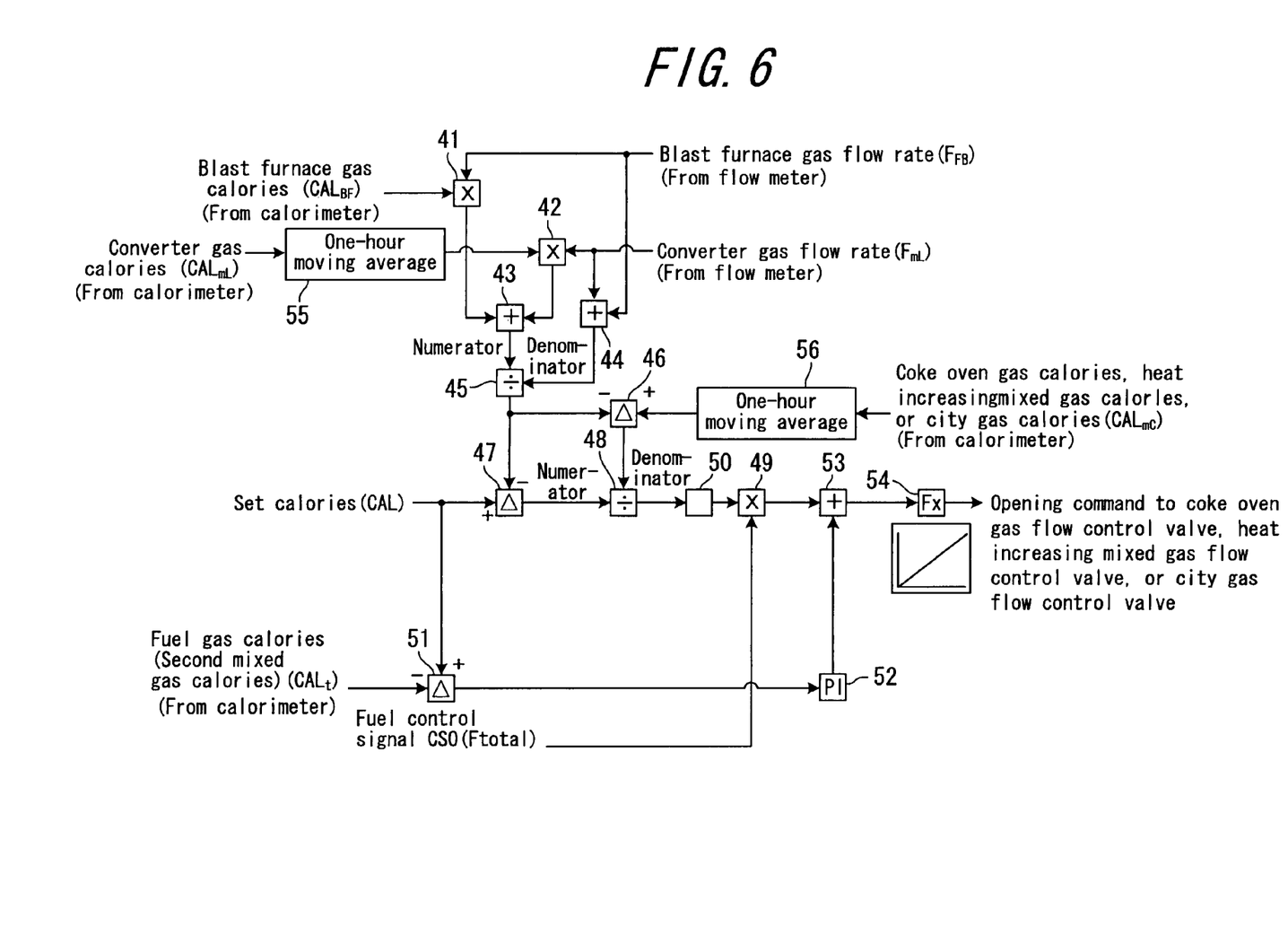
FIG. 6 is a block diagram showing the circuit configuration of a fuel gas calorie control device according to Embodiment 2 of the present invention applied to the fuel gas production system.

FIG. 5 is a configurational drawing of a fuel gas production system provided in an iron mill. FIG. 6 is a block diagram showing the circuit configuration of a fuel gas calorie control device according to Embodiment 2 of the present invention applied to the fuel gas production system. In FIGS. 5 and 6, the same parts as those in FIGS. 1 and 2 are assigned the same numerals as those in FIGS. 1 and 2.

As shown in FIG. 5, in a fuel gas production system according to the present Embodiment 2, a blast furnace gas calorimeter 61 as a blast furnace gas calorie measuring means for measuring the calories of a blast furnace gas is provided in a blast furnace gas supply piping line 22, a converter gas calorimeter 62 as a first heat increasing gas calorie measuring means for measuring the calories of a converter gas (first heat increasing gas) is provided in a converter gas supply piping line 18, and a coke oven gas calorimeter 63 as a second heat increasing gas calorie measuring means for measuring the calories of a coke oven gas (second heat increasing gas) is provided in a coke oven gas supply piping line 26. Moreover, a heat increasing mixed gas calorimeter 64 as a second heat increasing gas calorie measuring means for measuring the calories of a heat increasing mixed gas (second heat increasing gas) is provided in a heat increasing mixed gas supply piping line 29. If a city gas is used as the second heat increasing gas, a city gas calorimeter for measuring the calories of the city gas is provided in a city gas supply piping line.

Other features of the present fuel gas production system are the same as those in the fuel gas production system shown in FIG. 1, and thus their explanations are omitted herein.

A fuel gas calorie control device shown in FIG. 6 is applied to the fuel gas production system. The fuel gas calorie control device according to the aforementioned Embodiment 1 uses the preset blast furnace gas calories, the preset converter gas calories, and the preset second heat increasing gas calories such as the coke oven gas calories, the calories of the mixed gas consisting of the coke oven gas and the blast furnace gas, or the city gas calories, in calculating the calories of the first mixed gas (i.e., predicted calories), or in calculating the mixed flow rate required value of the second heating increasing gas such as the coke oven gas, the mixed gas consisting of the coke oven gas and the blast furnace gas, or the city gas. On the other hand, the fuel gas calorie control device according to the present Embodiment 2 uses the blast furnace gas calories measured by the blast furnace gas calorimeter 61, the converter gas calories measured by the converter gas calorimeter 62, and the coke oven gas calories measured by the coke oven gas calorimeter 63, or the heat increasing mixed gas calories measured by the heat increasing mixed gas calorimeter 64, or the city gas calories measured by the city gas calorimeter in calculating the calories of the first mixed gas (i.e., predicted calories), or in calculating the mixed flow rate required value of the second heating increasing gas such as the coke oven gas, the mixed gas consisting of the coke oven gas and the blast furnace gas, or the city gas. With the exception of these differences, the fuel gas calorie control device according to the present Embodiment 2 is the same as the fuel gas calorie control device according to the aforementioned Embodiment 1.

A detailed description will be offered based on FIG. 6. A calorie control circuit as a calorie control means shown in FIG. 6 is constructed of software, and run by a computer of a turbine control device or the like. However, this is not necessarily limitative, and a personal computer or hardware may constitute the calorie control circuit. With the calorie control circuit, the coke oven gas flow control valve 27, the heat increasing mixed gas flow control valve 35, or the city gas flow control valve is controlled to control the mixed flow rate of the coke oven gas, the heat increasing mixed gas, or the city gas so that the fuel gas (second mixed gas) supplied from the fuel gas production system to the blast furnace gas fired gas turbine equipment has prescribed calories (set calories: e.g. 1,000 kcal/m³N) required by the blast furnace gas fired gas turbine equipment. Here, the control over the mixed flow rate of the coke oven gas is described, but control over the mixed flow rate of the heat increasing mixed gas or the city gas is the same as that for the coke oven gas.

As shown in FIG. 6, the calorie control circuit receives, as inputs, a blast furnace gas flow rate $F_{FB}$ (a measurement signal representing the measured value of flow rate) which is the mixed flow rate of the blast furnace gas measured by the blast furnace gas flow meter 23, a converter gas flow rate $F_{mL}$ (a measurement signal representing the measured value of flow rate) which is the mixed flow rate of the converter gas measured by the converter gas flow meter 21, and fuel gas calories $CAL_t$ (a measurement signal representing the measured value of calories) being the calories of the fuel gas (second mixed gas) measured by the fuel gas calorimeter 37. Moreover, the blast furnace gas calories measured by the blast furnace gas calorimeter 61, the converter gas calories measured by the converter gas calorimeter 62, and the coke oven gas calories measured by the coke oven gas calorimeter 63 are inputted into the calorie control circuit. Furthermore, prescribed calories (set calorific value CAL) required by the blast furnace gas fired gas turbine equipment are preset (for example, set at 1,000 kcal/m³N) in the calorie control circuit. This set value may be arbitrarily set in a predetermined range by an operator using a setting instrument.

In the calorie control circuit, moreover, the gas turbine fuel gas requirement signal (fuel gas control signal) CSO is entered from the blast furnace gas fired gas turbine equipment. The gas turbine fuel gas requirement signal CSO is a signal which represents a flow rate $F_{total}$ corresponding to (conforming to) the fuel gas flow rate required by the blast furnace gas fired gas turbine equipment (fuel gas flow rate suited to gas turbine output), as shown in FIG. 3. For example, when the fuel gas flow rate, which is 80% of a rated fuel gas flow rate, is required for the blast furnace gas fired gas turbine equipment, the gas turbine fuel gas requirement signal CSO also serves as a signal representing the fuel gas flow rate which is 80% of the rated fuel gas flow rate.

Of the control functions of the calorie control circuit, an advanced control function will be described first of all. As shown in FIG. 6, a multiplying section 41 multiplies the blast furnace gas flow rate $F_{FB}$ (km³N/hr), and the blast furnace gas calories $CAL_{BF}$ (kcal/m³N) measured by the blast furnace gas calorimeter 61 (i.e., $F_{FB} \times CAL_{BF}$). In a multiplying section 42, the converter gas flow rate $F_{mL}$ (km³N/hr) and the converter gas calories $CAL_{mL}$ (kcal/m³N) measured by the converter gas calorimeter 62 are multiplied (i.e., $F_{mL} \times CAL_{mL}$) A one-hour moving average value computed by a moving average computing section 55 is used as the converter gas calories $CAL_{mL}$. This is not limitative, and the measured value of the converter gas calorimeter 62 may be used unchanged. In an adding section 43, the product in the multiplying section 41 and the product in the multiplying section 42 are added ($F_{FB} \times CAL_{BF} + F_{mL} \times CAL_{mL}$).

In an adding section 44, the blast furnace gas flow rate $F_{FB}$ and the converter gas flow rate $F_{mL}$ are added ($F_{FB} + F_{mL}$). In a dividing section 45, the sum in the adding section 43 (numerator) is divided by the sum in the adding section 44 (denominator) (i.e., $(F_{FB} \times CAL_{BF} + F_{mL} \times CAL_{mL})/(F_{FB} + F_{mL})$). That is, the division in the dividing section 45 determines (predicts) the calories (predicted calories $CAL_t'$) of the first mixed gas formed by the mixing of the blast furnace gas and the converter gas in the first mixer 17.

In a deviation computing section 46, a deviation between the quotient in the dividing section 45 (predicted calories $CAL_t'$) and the coke oven gas calories $CAL_{mC}$ measured by the coke oven gas calorimeter 63 is computed ($CAL_{mC} - CAL_t'$). A one-hour moving average value computed by a moving average computing section 56 is used as the coke oven gas calories $CAL_{mC}$. This is not limitative, and the measured value of the coke oven gas calorimeter 63 may be used unchanged. In a deviation computing section 47, a deviation between the quotient in the dividing section 45 (predicted calories $CAL_t'$) and the set calories CAL is computed ($CAL - CAL_t'$). In a dividing section 48, division is carried out for the computed deviation in the deviation computing section 46 (denominator) and the computed deviation in the deviation computing section 47 (numerator) (($CAL - CAL_t'$)/($CAL_{mC} - CAL_t'$)). That is, the division in the dividing section 48 determines the ratio between the flow rate $F_{total}$ of the second mixed gas (fuel gas), formed by mixing the first mixed gas and the coke oven gas in the second mixer 24, and the flow rate $F_{mC}$ of the coke oven gas necessary for rendering the calories of the second mixed gas (fuel gas) the set calories CAL, i.e., the ratio ($F_{mC}/F_{total}$).

In a multiplying section 49, the flow rate ratio ($F_{mC}/F_{total}$) obtained in the dividing section 48 is multiplied by the value of the gas turbine fuel gas requirement signal CSO, i.e., $F_{total}$, (($F_{mC}/F_{total}) \times F_{total}$). That is, the multiplication in the multiplying section 49 determines the required value of the mixed flow rate $F_{mC}$ necessary for rendering the calories of the second mixed gas (fuel gas) the set calories CAL.

However, a delay section 50 is provided between the dividing section 48 and the multiplying section 49 so that the execution of the multiplication in the multiplying section 49 can be delayed by a set time (dead time) in the delay section 50. The delay section 50 is a timing adjusting means for carrying out the opening control of the coke oven gas flow control valve 27 in synchronism with times when the blast furnace gas having the flow rate measured by the blast furnace gas flow meter 23 and the first heat increasing gas (converter gas) having the flow rate measured by the converter gas flow meter 21 are mixed in the first mixer 17 (first mixed gas), and the first mixed gas is further mixed with the coke oven gas in the second mixer 24. The concrete set time in the delay section 50 can be appropriately set by calculations and experiments based on the actual lengths of the piping lines and the actual gas flow velocities. It is, for example, 5 to 6 seconds.

Next, the function of the feedback control section of the calorie control circuit will be described. In a deviation computing section 51, a deviation between the set calories CAL and the fuel gas calories $CAL_t$ measured by the fuel gas calorimeter 38 is computed ($CAL - CAL_t$). In a PI (proportional plus integral) control section 52, PI control is effected based on the deviation computed in the deviation computing section 51 to determine a correction amount for the mixed flow rate of the coke oven gas. Here, the control means is not necessarily limited to PI control, and other control means can be applied.

In an adding section 53, the required value of the flow rate $F_{mC}$ of the coke oven gas (i.e., the product in the multiplying section 49) found in the advanced control section, and the correction amount $F_{mC}'$ for the mixed flow rate of the coke oven gas obtained in the feedback control section (i.e., the output value of the PI control section 52) are added ($F_{mC} + F_{mC}'$). In this manner, the required value of the flow rate $F_{mC}$ of the coke oven gas found in the advanced control section (i.e., the product in the multiplying section 49) is corrected with the correction amount $F_{mC}'$ for the coke oven gas flow rate found in the feedback control section. The corrected mixed flow rate required value of the coke oven gas is converted in a function computing section 54 into the opening of the coke oven gas flow control valve 27 corresponding to the mixed flow rate required value of the coke oven gas, to output a valve opening command to the coke oven gas flow control valve 27. Thus, the opening of the coke oven gas flow control valve 27 is controlled to the value of the valve opening command, so that the mixed flow rate of the coke oven gas is controlled to the mixed flow rate required value of the coke oven gas.

As described above, according to the fuel gas calorie control device of the present Embodiment 2, the calories of the first mixed gas are predicted by calculations based on the mixed flow rate $F_{FB}$ of the blast furnace gas measured by the blast furnace gas flow meter 23, the mixed flow rate $F_{mL}$ of the converter gas measured by the converter gas flow meter 21, the blast furnace gas calories $CAL_{BF}$ measured by the blast furnace gas calorimeter 61, and the converter gas calories $CAL_{mL}$ measured by the converter gas calorimeter 62. The flow rate ratio of the mixed flow rate of the coke oven gas (or the heat increasing mixed gas or city gas) to the gas turbine consumed fuel gas flow rate is calculated based on the above predicted calories, the set calories CAL, and the coke oven gas calories $CAL_{mC}$ measured by the coke oven gas calorimeter 63 (or the heat increasing mixed gas calories measured by the heat increasing mixed gas calorimeter 64, or the city gas calories measured by the city gas calorimeter) The mixed flow rate required value of the coke oven gas (or the heat increasing mixed gas or city gas) is calculated based on the above flow rate ratio, and the gas turbine fuel gas requirement signal CSO corresponding to the gas turbine consumed fuel gas flow rate. The opening of the coke oven gas flow control valve 27 (or the heat increasing mixed gas flow control valve 35 or the city gas flow control valve) provided in the fuel gas production system is controlled based on the above mixed flow rate required value to control the mixed flow rate of the coke oven gas (or the heat increasing mixed gas or city gas). Thus, the following actions and effects are obtained:

The mixed flow rate of the coke oven gas (or the heat increasing mixed gas or city gas) changes (increases or decreases) in a constant proportion, in accordance with changes (increases or decreases) in the gas turbine fuel gas requirement signal CSO, namely, in accordance with changes (increases or decreases) in the gas turbine consumed fuel gas flow rate associated with changes (increases or decreases) in the gas turbine output, for example, as illustrated in FIG. 4. The blast furnace gas is increased by exercising control so as to reach the fuel gas flow rate required by the blast furnace gas fired gas turbine equipment (fuel gas flow rate suited to the gas turbine output) based on the gas turbine fuel gas requirement signal CSO in the flow control section on the blast furnace gas fired gas turbine equipment side (fuel gas flow control valve). The converter gas is increased, for example, by controlling the opening of the converter gas flow control valve 19 such that the converter gas flow rate is in a constant proportion to the gas turbine fuel gas requirement signal CSO (fuel gas flow rate $F_{total}$).

The present fuel gas calorie control device can exercise calorie control by mixing the two types of heat increasing gases, namely, the converter gas and the coke oven gas (or the heat increasing mixed gas or city gas), with the blast furnace gas. Moreover, even if rapid calorie changes occur in the first mixed gas owing to flow rate changes of the converter gas according to the operating state of the converter 13, the calorie changes are predicted (predicted calories are calculated), and the flow rate of the coke oven gas (or the heat increasing mixed gas or city gas) is advancedly controlled so as to compensate for the calorie changes. Thus, the calories of the fuel gas (second mixed gas) can be kept at the set calories CAL. Furthermore, the calorie changes of the first mixed gas due to the flow rate changes of the converter gas can be compensated for by the coke oven gas (or the heat increasing mixed gas or city gas). Thus, the mixed flow rate of the converter gas can be set arbitrarily. In other words, the relatively unstable converter gas can be utilized as a gas for producing the fuel gas by compensating for the calorie changes of the first mixed gas according to the flow rate changes of the converter gas by the relatively stable coke oven gas (or the heat increasing mixed gas or city gas).

Besides, the opening control of the coke oven gas flow control valve 27 (or the heat increasing mixed gas flow control valve 35 or the city gas flow control valve) is exercised in synchronism with the time when the first mixed gas arrives at the second mixer 24 as the site of mixing of the first mixed gas and the coke oven gas (or the heat increasing mixed gas or city gas). Thus, the mixing of the coke oven gas (or the heat increasing mixed gas or city gas) into the first mixed gas can be performed with a more proper timing, and the calories of the fuel gas (second mixed gas) can be controlled more accurately.

In addition, feedback on the calories of the fuel gas (second mixed gas) measured by the fuel gas calorimeter 38 is given. A correction amount for the mixed flow rate of the coke oven gas (or the heat increasing mixed gas or city gas) is determined based on the deviation between the feedback calories of the fuel gas (second mixed gas) and the set calories CAL. The mixed flow rate required value of the coke oven gas (or the heat increasing mixed gas or city gas) is corrected with this correction amount. The opening of the coke oven gas flow control valve 27 (or the heat increasing mixed gas flow control valve 35 or the city gas flow control valve) is controlled based on the corrected mixed flow rate required value to control the mixed flow rate of the coke oven gas (or the heat increasing mixed gas or city gas). Thus, even if discrepancy occurs between the calories of the fuel gas (second mixed gas) and the set calories CAL, feedback on the calories $CAL_t$ of the fuel gas (second mixed gas) measured by the fuel gas calorimeter 38 is provided, whereby the flow rate of the coke oven gas (or the heat increasing mixed gas or city gas) can be subjected to feedback control so that the calories of the fuel gas (second mixed gas) agree with the set calories CAL. Thus, the calories of the fuel gas (second mixed gas) can be controlled more accurately.

Additionally, the present fuel gas calorie control device uses the blast furnace gas calories measured by the blast furnace gas calorimeter 61, the converter gas calories measured by the converter gas calorimeter 62, and the coke oven gas calories measured by the coke oven gas calorimeter 63 (or the heat increasing mixed gas calories measured by the heat increasing mixed gas calorimeter 64, or the city gas calories measured by the city gas calorimeter), in calculating the calories of the first mixed gas (i.e., predicted calories), or in calculating the mixed flow rate required value of the coke oven gas (or the heat increasing mixed gas or the city gas). Thus, even if the blast furnace gas calories, the converter gas calories, or the coke oven gas calories (or the heat increasing mixed gas calories or the city gas calories) change, the flow rate of the second heat increasing gas is controlled to keep the calories of the fuel gas (second mixed gas) at the set calories CAL. Hence, calorie changes of the blast furnace gas, the converter gas, or the coke oven gas (or the heat increasing mixed gas or the city gas) can be accommodated.

The present invention with the above-described features is useful when applied in mixing two types of heat increasing gases into a blast furnace gas (especially when using a converter gas as the heat increasing gas) to produce a fuel gas.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A fuel gas calorie control method which is applied to a fuel gas production system for mixing a first heat increasing gas with a blast furnace gas discharged from a blast furnace of an iron mill to form a first mixed gas, further mixing a second heat increasing gas with the first mixed gas to form a second mixed gas, and supplying the second mixed gas, as a fuel gas, to blast furnace gas fired gas turbine equipment, and which exercises control such that calories of the second mixed gas become set calories required by the blast furnace gas fired gas turbine equipment, the fuel gas calorie control method comprising:
predicting calories of the first mixed gas by calculations based on a mixed flow rate of the blast furnace gas measured by blast furnace gas flow rate measuring means, a mixed flow rate of the first heat increasing gas measured by first heat increasing gas flow rate measuring means, preset blast furnace gas calories, and preset first heat increasing gas calories;

calculating a flow rate ratio of a mixed flow rate of the second mixed gas to a gas turbine consumed fuel gas flow rate based on the predicted calories, the set calories, and preset second heat increasing gas calories;

calculating a mixed flow rate required value of the second heat increasing gas based on the flow rate ratio and a gas turbine fuel gas requirement signal corresponding to the gas turbine consumed fuel gas flow rate; and controlling an opening of a flow control valve for the second heat increasing gas provided in the fuel gas production system, based on the mixed flow rate required value of the second heat increasing gas, to control a mixed flow rate of the second heat increasing gas.

2. A fuel gas calorie control method which is applied to a fuel gas production system for mixing a first heat increasing gas with a blast furnace gas discharged from a blast furnace of an iron mill to form a first mixed gas, further mixing a second heat increasing gas with the first mixed gas to form a second mixed gas, and supplying the second mixed gas, as a fuel gas, to blast furnace gas fired gas turbine equipment, and which exercises control such that calories of the second mixed gas become set calories required by the blast furnace gas fired gas turbine equipment, the fuel gas calorie control method comprising:

predicting calories of the first mixed gas by calculations based on a mixed flow rate of the blast furnace gas measured by blast furnace gas flow rate measuring means, a mixed flow rate of the first heat increasing gas measured by first heat increasing gas flow rate measuring means, calories of the blast furnace gas measured by blast furnace gas calorie measuring means, and calories of the first heat increasing gas measured by first heat increasing gas calorie measuring means;

calculating a flow rate ratio of a mixed flow rate of the second mixed gas to a gas turbine consumed fuel gas flow rate based on the predicted calories, the set calories, and calories of the second heat increasing gas measured by second heat increasing gas calorie measuring means;

calculating a mixed flow rate required value of the second heat increasing gas based on the flow rate ratio and a gas turbine fuel gas requirement signal corresponding to the gas turbine consumed fuel gas flow rate; and controlling an opening of a flow control valve for the second heat increasing gas provided in the fuel gas production system, based on the mixed flow rate required value of the second heat increasing gas, to control a mixed flow rate of the second heat increasing gas.

3. The fuel gas calorie control method according to claim 1, further comprising:

exercising opening control of the second heat increasing gas flow control valve in synchronism with a time when the first mixed gas arrives at a site of mixing of the first mixed gas and the second heat increasing gas.

4. The fuel gas calorie control method according to claim 2, further comprising:

exercising opening control of the second heat increasing gas flow control valve in synchronism with a time when the first mixed gas arrives at a site of mixing of the first mixed gas and the second heat increasing gas.

5. The fuel gas calorie control method according to claim 1, further comprising:

giving feedback on the calories of the second mixed gas measured by fuel gas calorie measuring means;

determining a correction amount for the mixed flow rate of the second heat increasing gas based on a deviation between the feedback calories of the second mixed gas and the set calories;

correcting the mixed flow rate required value of the second heat increasing gas with the correction amount; and controlling the opening of the second heat increasing gas flow control valve, based on the corrected mixed flow rate required value of the second heat increasing gas, to control the mixed flow rate of the second heat increasing gas.

6. The fuel gas calorie control method according to claim 2, further comprising:

giving feedback on the calories of the second mixed gas measured by fuel gas calorie measuring means;

determining a correction amount for the mixed flow rate of the second heat increasing gas based on a deviation between the feedback calories of the second mixed gas and the set calories;

correcting the mixed flow rate required value of the second heat increasing gas with the correction amount; and controlling the opening of the second heat increasing gas flow control valve, based on the corrected mixed flow rate required value of the second heat increasing gas, to control the mixed flow rate of the second heat increasing gas.

7. The fuel gas calorie control method according to claim 1, wherein the first heat increasing gas is a converter gas discharged from a converter of the iron mill.

8. The fuel gas calorie control method according to claim 2, wherein the first heat increasing gas is a converter gas discharged from a converter of the iron mill.

9. The fuel gas calorie control method according to claim 1, wherein the second heat increasing gas is a coke oven gas discharged from a coke oven of the iron mill, a mixed gas consisting of the coke oven gas and the blast furnace gas, or a city gas.

10. The fuel gas calorie control method according to claim 2, wherein the second heat increasing gas is a coke oven gas discharged from a coke oven of the iron mill, a mixed gas consisting of the coke oven gas and the blast furnace gas, or a city gas.

11. A fuel gas calorie control device which is applied to a fuel gas production system for mixing a first heat increasing gas with a blast furnace gas discharged from a blast furnace of an iron mill to form a first mixed gas, further mixing a second heat increasing gas with the first mixed gas to form a second mixed gas, and supplying the second mixed gas, as a fuel gas, to blast furnace gas fired gas turbine equipment, and which exercises control such that calories of the second mixed gas become set calories required by the blast furnace gas fired gas turbine equipment, the fuel gas calorie control device comprising:

blast furnace gas flow rate measuring means for measuring a mixed flow rate of the blast furnace gas;

first heat increasing gas flow rate measuring means for measuring a mixed flow rate of the first heat increasing gas; and calorie control means which predicts calories of the first mixed gas by calculations based on the mixed flow rate of the blast furnace gas measured by the blast furnace gas flow rate measuring means, the mixed flow rate of the first heat increasing gas measured by the first heat increasing gas flow rate measuring means, preset blast furnace gas calories, and preset first heat increasing gas calories, calculates a flow rate ratio of a mixed flow rate of the second mixed gas to a gas turbine consumed fuel gas flow rate based on the predicted calories, the set calories, and preset second heat increasing gas calories, calculates a mixed flow rate required value of the second heat increasing gas based on the flow rate ratio and a gas turbine fuel gas requirement signal corresponding to the gas turbine consumed fuel gas flow rate, and controls an opening of a flow control valve for the second heat increasing gas provided in the fuel gas production system, based on the mixed flow rate required value of the second heat increasing gas, to control a mixed flow rate of the second heat increasing gas.

12. A fuel gas calorie control device which is applied to a fuel gas production system for mixing a first heat increasing gas with a blast furnace gas discharged from a blast furnace of an iron mill to form a first mixed gas, further mixing a second heat increasing gas with the first mixed gas to form a second mixed gas, and supplying the second mixed gas, as a fuel gas, to blast furnace gas fired gas turbine equipment, and which exercises control such that calories of the second mixed gas become set calories required by the blast furnace gas fired gas turbine equipment, the fuel gas calorie control device comprising:

blast furnace gas flow rate measuring means for measuring a mixed flow rate of the blast furnace gas;

first heat increasing gas flow rate measuring means for measuring a mixed flow rate of the first heat increasing gas;

blast furnace gas calorie measuring means for measuring calories of the blast furnace gas;

first heat increasing gas calorie measuring means for measuring calories of the first heat increasing gas;

second heat increasing gas calorie measuring means for measuring calories of the second heat increasing gas; and calorie control means which predicts calories of the first mixed gas by calculations based on the mixed flow rate of the blast furnace gas measured by the blast furnace gas flow rate measuring means, the mixed flow rate of the first heat increasing gas measured by the first heat increasing gas flow rate measuring means, the calories of the blast furnace gas measured by the blast furnace gas calorie measuring means, and the calories of the first heat increasing gas measured by the first heat increasing gas calorie measuring means, calculates a flow rate ratio of a mixed flow rate of the second mixed gas to a gas turbine consumed fuel gas flow rate based on the predicted calories, the set calories, and the calories of the second heat increasing gas measured by the second heat increasing gas calorie measuring means, calculates a mixed flow rate required value of the second heat increasing gas based on the flow rate ratio and a gas turbine fuel gas requirement signal corresponding to the gas turbine consumed fuel gas flow rate, and controls an opening of a flow control valve for the second heat increasing gas provided in the fuel gas production system, based on the mixed flow rate required value of the second heat increasing gas, to control a mixed flow rate of the second heat increasing gas.

13. The fuel gas calorie control device according to claim 11, wherein
the calorie control means includes second heat increasing gas flow control valve action timing adjusting means for exercising opening control of the second heat increasing gas flow control valve in synchronism with a time when the first mixed gas arrives at a site of mixing of the first mixed gas and the second heat increasing gas.

14. The fuel gas calorie control device according to claim 12, wherein
the calorie control means includes second heat increasing gas flow control valve action timing adjusting means for exercising opening control of the second heat increasing gas flow control valve in synchronism with a time when the first mixed gas arrives at a site of mixing of the first mixed gas and the second heat increasing gas.

15. The fuel gas calorie control device according to claim 11, wherein
the calorie control means includes feedback control means for giving feedback on the calories of the second mixed gas measured by fuel gas calorie measuring means, and determining a correction amount for the mixed flow rate of the second heat increasing gas based on a deviation between the feedback calories of the second mixed gas and the set calories, corrects the mixed flow rate required value of the second heat increasing gas with the correction amount determined by the feedback control means, and controls the opening of the second heat increasing gas flow control valve, based on the corrected mixed flow rate required value of the second heat increasing gas, to control the mixed flow rate of the second heat increasing gas.

16. The fuel gas calorie control device according to claim 12, wherein
the calorie control means includes feedback control means for giving feedback on the calories of the second mixed gas measured by fuel gas calorie measuring means, and determining a correction amount for the mixed flow rate of the second heat increasing gas based on a deviation between the feedback calories of the second mixed gas and the set calories, corrects the mixed flow rate required value of the second heat increasing gas with the correction amount determined by the feedback control means, and controls the opening of the second heat increasing gas flow control valve, based on the corrected mixed flow rate required value of the second heat increasing gas, to control the mixed flow rate of the second heat increasing gas.

17. The fuel gas calorie control device according to claim 11, wherein
the first heat increasing gas is a converter gas discharged from a converter of the iron mill.

18. The fuel gas calorie control device according to claim 12, wherein
the first heat increasing gas is a converter gas discharged from a converter of the iron mill.

19. The fuel gas calorie control device according to claim 11, wherein
the second heat increasing gas is a coke oven gas discharged from a coke oven of the iron mill, a mixed gas consisting of the coke oven gas and the blast furnace gas, or a city gas.

20. The fuel gas calorie control device according to claim 12, wherein
the second heat increasing gas is a coke oven gas discharged from a coke oven of the iron mill, a mixed gas consisting of the coke oven gas and the blast furnace gas, or a city gas.

* * * * *